United States Patent [19]

Ewert et al.

[11] 3,830,506

[45] Aug. 20, 1974

[54] FOIL RECORD CARRIER

[75] Inventors: Manfred Ewert; Klaus Roggenbuck, both of Berlin, Germany

[73] Assignee: TED Bildplatten Aktiengesellschaft, Zug, Switzerland

[22] Filed: Dec. 11, 1972

[21] Appl. No.: 313,668

[30] Foreign Application Priority Data

Dec. 11, 1971 Germany ........................... 2162220
Dec. 11, 1971 Germany ........................... 7147225

[52] U.S. Cl. ......... 274/39 A, 340/174.1 E, 346/137
[51] Int. Cl. ............................................ G11b 3/60
[58] Field of Search ............... 274/39 R, 39 A, 41.4; 179/100.2 P; 340/174.1 E; 346/137

[56] References Cited

UNITED STATES PATENTS 3,369,227 2/1968 Boissevain .................... 274/39 A X
3,603,742 9/1971 Schuller ........................ 179/100.2 P

FOREIGN PATENTS OR APPLICATIONS 1,172,310 6/1964 Germany ...................... 340/174.1 E

*Primary Examiner*—Louis R. Prince
*Assistant Examiner*—Charles E. Phillips
*Attorney, Agent, or Firm*—Spencer & Kaye

[57] ABSTRACT

A recording and/or playback device for a foil record carrier including a stabilizing surface which is formed to be upwardly concave about an axis of curvature above which a similarly shaped foil record is rotated for recording and/or playback. The foil record rotates at a high relative speed of rotation on a cushion of air established between itself and the stabilizing surface. A transducer element is mounted near the lowest point of the concave stabilizing surface to be movable substantially in the direction of the axis of curvature of that surface.

6 Claims, 6 Drawing Figures

FOIL RECORD CARRIER

BACKGROUND OF THE INVENTION

The present invention relates to a recording and/or playback device for a flexible foil record carrier which in operation rotates on a cushion of air at a high relative speed of rotation with respect to a stabilizing surface.

It is known to stabilize foil record carriers which rotate at high speeds by having them rotate at a slight distance above a planar, stationary stabilzing surface of a stabilizing plate, or disc, or forming a cushion of air between the foil record and the stabilizing surface. The air forming the air cushion flows under the influence of centrifugal force through an opening formed between the stabilzing surface and the foil record. Because of the gravity forces acting on the foil record, the centrifugal forces mentioned above, which attempt to hold the foil record at a slight distance from the stabilizing surface, the electrostatic forces which occur between the foil record and the stabilizing plate due to the relative motion between them, the static pressure forces developed by the air cushion and the atmospheric pressure forces of the ambient air, all of which are in equilibrium, the foil record maintains its spacing from the stabilizing surface with a high degree of consistency.

It is also known that in order to improve the stabilization of a rapidly rotating foil record when positioned for playback, the stabilizing surface is provided with a curvature at whose vertex a transducing element or pickup is disposed during the playback process. The curvature increases the rigidity of the foil record so that the record is better able to withstand the interfering forces which act perpendicularly against the record surface in the vicinity of the vertex line. The reactive forces produced by the increased rigidity of the foil record against the interfering forces additionally contribute to the maintenance of the above-mentioned stable equilibrium condition.

It has been found, however, that the additional stabilization effect produced by the curvature cannot be fully utilized because the foil record, which rotates above a curved stabilizing plate, requires a higher driving force to maintain its speed of rotation than a foil record rotating above a planar stabilizing disc. If this driving force is not supplied, the air cushion collapses and the foil record adheres to the stabilizing disc. One way to counteract this effect and maintain the rotation of the foil record is, as is known in the case of a planar stabilizing disc, to increase the size of the driving motor. Another way would be to increase the thickness of the air space between the foil record and the stabilizing surface by shifting the central attachment of the foil record further from the stabilizing surface. Both solutions are undesirable, however, because of the increased expenditure of energy required to maintain the high driving force, and because the stabilizing effect is decreased when the air space is increased.

It is also known to provide openings or grooves in the surface of the stabilizing disc in order to contribute to the reduction of the driving energy required for driving the foil record. Because of the openings or grooves, additional air is supplied for the air cushion resulting in a reduction of the friction generated. However, these grooves or openings become contaminated relatively quickly so that frequent cleaning is required, which is at least annoying for the user of the playback device.

SUMMARY OF THE INVENTION

It is, therefore, an object of the present invention to increase the effective rigidity of a rotating foil record carrier during recording and/or playback, in the recording and playback areas thereof, and thus improve its stability to a point substantially comparable to that occurring during operation with a planar stabilization surface without undesirable side effects such as those discussed above.

This as well as other objects are achieved according to the present invention by giving at least portions of the stabilizing surface a form which is upwardly concave about an axis of curvature and disposing a transducing element in the vicinity of the lowest point of the concave surface to be movable substantially in the longitudinal direction of the axis of the curvature.

The present invention retains the advantages of a curved stabilizing disc, while avoiding its drawbacks, as will be explained below.

A further advantage of the device according to the present invention is that the curvature of the stabilizing surface permits close conformance of the foil record with the stabilizing surface without any significant stretching or buckling of the foil record occurring. When a planar foil record is used this means that the stabilizing surface is to have a simple curvature, i.e., to be curved in a direction in only one plane normal to its surface.

A still further advantage of the device according to the present invention occurs in conjunction with a contact surface, which is provided for example by a rotatable supporting plate for the foil record. The contact surface which supports movement of the foil record is disposed, during operation of the device, away from the stabilizing surface and in the air space formed by the stabilizing surface. The outer surface of the supporting plate may advantageously be disposed in an opening, which forms an air input opening for feeding air to the air space, and which is located in the center of the stabilizing surface. The upper edge of the supporting plate preferably extends beyond the edge of the air input opening over its entire circumference and into the concave air space formed by the stabilizing surface.

If in the attempt to additionally improve stabilization of the foil record there exists the readiness or necessity to include the above-mentioned side effects of the known devices, their features may be used in addition to the features of the present invention unless one feature excludes another.

DESCRIPTION OF THE PREFERRED EMBODIMENTS

Figure 1:
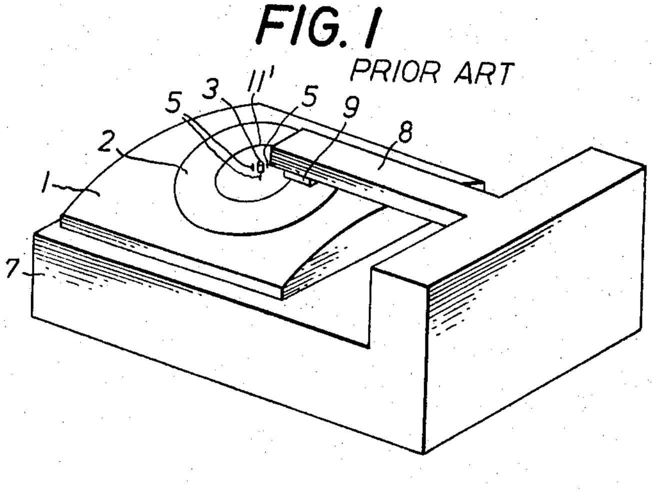
FIG. 1 PRIOR ART
FIG. 1 is a simplified perspective view illustrating a known embodiment of a recording and/or playback device.

Stabilizing surfaces 1 and 10 of the devices illustrated in FIGS. 1–2 and 3–6, respectively, are stationary while a foil record 2 rotates about the axis of a drive shaft 3, which is driven during operation by a motor 6. A supporting plate 4 mounted on the drive shaft 3 is provided with three pins 5 which extend outwardly from a contact surface 4′ of the supporting plate 4. These pins pass through the foil record 2 and retain it in rotational alignment with the supporting plate 4. A housing 7 of the recording and/or playback device has a stationary transducer support arm 8 extending in a longitudinal direction therefrom. A carriage 9 is disposed at the underside of the arm 8 so that it can be moved in the direction of the arrows 9′ shown in FIG. 6. The carriage 9 supports a transducer element or pickup (not shown). The pickup scans, for example during playback, the recording track of the foil record 2 between its outer edge 11 and the innermost turn 11′. The carriage 9 is moved by conventional means (not shown) along the arm 8, which substantially coincides with a radius of the foil record 2, in order to be able to follow the turns of the recording track.

Figure 2:
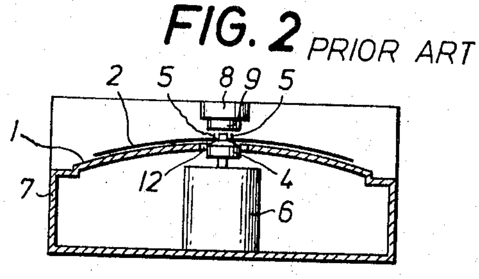
FIG. 2 PRIOR ART
FIG. 2 is a transverse cross-sectional view of the recording and/or playback device illustrated in FIG. 1.
Figure 3:
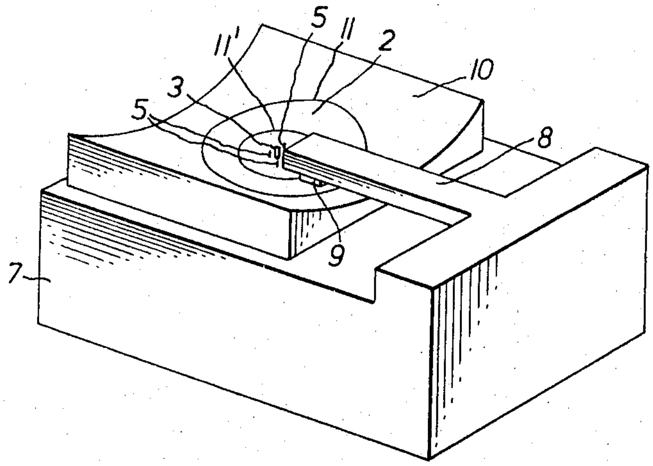
FIG. 3 is a simplified perspective view of a recording and/or playback device according to the present invention.

Referring to the known device illustrated in FIGS. 1 and 2, it can be seen that the stabilizing surface 1 is upwardly convex and that the curvature of the foil record 2 conforms to that of the surface 1. The forces acting on the foil record 2 in a direction perpendicular to the record and at the vertex of the foil record curvature, where the recording and/or playback is effected by means of a transducing element, encounter a particularly rigid foil record. From the standpoint of force development, the convex foil record acts similarly to an approximately U-shaped beam and counteracts substantially all movement of that portion of the foil record disposed under the carriage 9 with a particularly strong resistive moment. Contrary to the conditions existing with a foil record rotating above a planar stabilizing surface, almost the entire foil record 2 would have to be lifted from the stabilizing surface if it were attempted to move that portion of the foil record 2 disposed below the carriage 9 in the direction toward the carriage 9. It can clearly be seen that a greater interfering force woudl be required to effect an undesired movement of that portion of the foil record 2 presently disposed below the carriage 9 in the direction toward the tone arm 8 than with a device employing a planar stabilzing surface. For this reason interfering up-and-down movement of portions of the foil record 2 are suppressed in the area of the carriage 9 where the recording or playback, respectively, takes place.

The foil record 2 occupies a more stable position during operation with respect to the transducing element with a curved stabilizing surface than with a planar stabilizing surface.

Although the curved stabilizing surface of the type shown in FIGS. 1 and 2 is advantageous, it does produce certain undesirable side effects. As is known, the stabilizing effect of the air cushion formed between the foil record 2 and the stabilizing surface 1 is better, the thinner the air cushion. However, with increasing thinness of the air cushion the friction moment between the foil record 2 and the stabilizing surface to be overcome by the motor 6 increases. This was previously recognized with the planar stabilizing surfaces. With a curved stabilizing surface there appears an additional phenomenon. During operation, centrifugal forces pull radially outwardly on the foil record 2 in an effort to bring the foil record 2 from a curved into a planar state. The planar state can be obtained in the edge portions of the foil record 2 as the foil record is lifted away from the stabilizing surface 1, while the center portion of the foil record is forced in the direction of the input opening 12 through which air flows toward the air space between the foil record and the stabilizing surface to continuously replace the air for the air cushion expelled outwardly by the centrifugal forces. Such downward pressure on the portions of the foil record 2 disposed above the air inlet opening 12 may interrupt the supply of air to the air space so that the air cushion collapses. Moreover, the resisting friction between the foil record 2 and the stabilizing surface 1 will then suddenly increase so that the rotation of the foil record is interrupted.

Such an undesirable effect could perhaps be prevented by slightly lifting the supporting plate 4. However, such a measure would worsen the stabilizing effect of the air cushion.

The present invention utilizes the advantages of the curved configuration while eliminating its disadvantages. Referring specifically to the embodiment illustrated in FIGS. 3 through 6, the stabilizing surface 10 is curved to be upwardly concave in the form of a trough, this upwardly concave curvature being about an axis of curvature which is parallel to the longitudinal axis of the arm 8. A transducing element is mounted on the carriage 9, which is arranged in the vicinity of the lowest point of the concave surface. The carriage 9 is displaceably mounted on the tone arm 8 substantially in the direction of the axis of curvature. Again suitable curvature of the foil record 2 insures that it stiffens similarly to a U-shaped beam with respect to the interfering forces which may affect the stable position of portions of the foil record 2 disposed below the carriage 9. However, those portions of the foil record 2 which are disposed above the air inlet opening 12 are not pressed against the inlet opening when the centrifugal forces acting on the foil record 2 tension it into a planar state. Rather, the center portion of the foil record 2 is displaced upwardly away from the air inlet opening 12. Consequently, blockage of the inlet opening 12 is prevented. However, to insure the proper force development it is advisable to fasten the foil record 2 to the supporting plate 4 in such a manner that it is retained fastened during operation, so that the planar state is not achieved. In the cross-sectional view of FIG. 5, it can be seen that the foil record 2 could be brought into the planar state only if it were lifted away from supporting plate 4.

Figure 4:
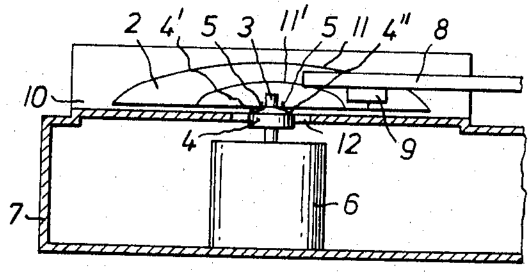
FIG. 4 is a partial longitudinal cross-sectional view of the recording and/or playback device illustrated in FIG. 3.
Figure 5:
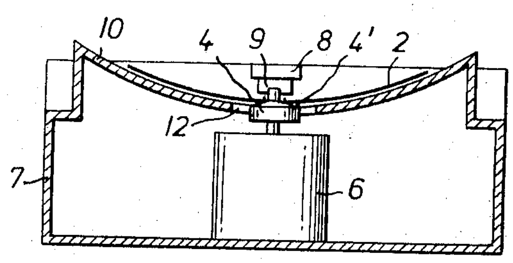
FIG. 5 is a transverse cross-sectional view of the recording and/or playback device illustrated in FIG. 3.
Figure 6:
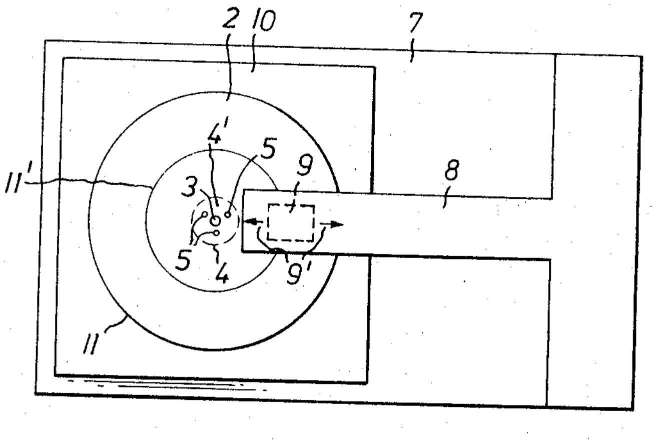
FIG. 6 is a top plan view of the device illustrated in FIG. 3.

From FIG. 4 it can be seen that the lowest point of the concave surface in the longitudinal direction parallel to the tone arm axis defines a straight line.

In the embodiment of the present invention illustrated in FIGS. 3–6, only a slight friction moment exists between the stabilizing surface 10 and the foil record 2 so that a relatively low-powered motor can be used.

The motor only has to produce a turning moment of 40 p cm (0.04 $kg_{force}$ x cm) while in the case of a stabilizing surface of convex curvature it would be 80 pcm.

But the difference between these two turning moments is dependent upon electrostatic charging effects, which are very little if a stabilizing surface of concave curvature is used, and which are considerably greater if a convex curvature is used; because in the second case the distance between the brink of the opening 12 and the foil record is so small that dust particles in the art stream can more easily rub against the foil and against the stabilizing surface, so that there occurs an electrostatic charging which acts to reduce said distance and this produces a further increase in the electrostatic charging.

The supporting plate 4 need not protrude any further above the surrounding surface of the stabilizing surface 10 than it does in the case of a planar stabilizing surface, so that the advantage gained with respect to stabilization by the curved stabilizing surface is not lost even in part by a supporting plate which protrudes further out from the stabilizing surface. For safety rotatable it is advisable, however, for the outer edge 4'' of the rotable supporting plate 4, which is disposed at the bottom center of the stabilizing surface 10, to protrude above the edge of the air inlet opening 12 into the concave recess or air space formed between the stabilizing surface 10 and the foil record 2. This will assure that even when the electrostatic charges developed in the air space, due to the relative rotation between the foil record 2 and the surface 10, produce attraction forces between the stabilizing surface 10 and the foil record 2, which forces tend to pull the foil record 2 against the air input opening 12, the air input opening 12 cannot be blocked by the foil record 2.

Pertinent dimensions of an embodiment of the invention are the following:

diameter of the foil record: 210 mm,
gage of the foil record: 0.1 mm,
rate of rotation: 1,500 rpm
radius of curvature of the stabilizing surface: 1.4 m protruding height of supporting plate 4: 0.2 mm
diameter of plate 4: 40 mm
diameter of opening 12: 42 mm.

The influence of the forces produced by the electrostatic charges are not a serious factor when the device is used, for example, in the data processing art, because such devices are usually operated in air-conditioned rooms, so that the influences of the electrostatic charges remain unchanged due to the constant humidity of the air. However, for instruments which do not operate in air-conditioned areas, for example video record playback devices, the influences of the electrostatic charges may fluctuate greatly and therefore become significant, so that it would be advisable to give greater consideration to these influences, i.e., to use the concave stabilizing surface of the invention. If further steps are desired to avoid the effects of electrostatic charges it is possible to use the features described in copending U.S. Pat. application Ser. No. 100,724 now U.S. Pat. NO. 3,767,865, issued on Oct. 23, 1973. In one embodiment of the invention the material of the record is soft PVC and the material of the stabilizing surface is "Makrolon 3,000" manufactured by Bayer, Leverkusen, West Germany.

In order to prevent the occurrence of additional forces which might tend to wrap the foil record 2, the stabilizing surface 10 should preferably have such a curvature that it permits the foil record to conform thereto without being subjected, during this conformance, to substantial stretching or buckling.

In the preferred use of planar foil record carriers, the stabilizing surface should therefore be developable in one plane. For example, the stabilizing surface may have the form of a cylindrical surface.

The stabilizing surface need not extend below the entire surface of the foil record.

For example there may be a hole in those parts of the stabilizing surface which are not in the vicinity of that area of the foil record over which the transducing element moves. There is also no essential influence on the reproduction quality of recorded television pictures if the border of the stabilizing surface is disposed between the greatest winding of a spiral track of a foil record and the border of the record, as described in the German Offenlegungsschrift Pat. No. 20 32 290.

It will be understood that the above description of the present invention is susceptible to various modifications, changes and adaptations, and the same are intended to be comprehended within the meaning and range of equivalents of the appended claims.

We claim:

1. In a recording and/or playback device for a flexible foil record carrier, the device including a stabilizing surface and a transducing element, the device being arranged to rotate such record carrier on an air cushion between the carrier and the stabilizing surface at a high relative speed of rotation with respect to, and above, the stabilizing surface, the improvement wherein at least the portion of said stabilizing surface underlying the record carrier has a form which is upwardly concave about an axis of curvature and said element is mounted above the lowest point of the concave surface to be movable along a line substantially parallel to the axis of curvature.

2. The device as defined in claim 1, wherein the entirety of said stabilizing surface has a form which is upwardly concave about such axis of curvature.

3. The device as defined in claim 1, wherein said stabilizing surface is developable in a plane.

4. The device as defined in claim 3, wherein said stabilizing surface has the form of a portion of a cylinder.

5. The device as defined in claim 1, wherein said stabilizing surface is provided with an air input opening at its center, and said device further comprises: a supporting plate; and means mounting said supporting plate for rotation in said input opening, said plate having an outer edge which extends into the concave shaped air space formed by said stabilizing surface.

6. The device as defined in claim 1, further comprising a supporting plate and means mounting said supporting plate for rotation, wherein said supporting plate defines a contact surface on which the foil record is supported for rotation, said contact surface being spaced from said stabilizing surface at the side thereof where the gas cushion is disposed when a record carrier is rotated thereon.

* * * * *

UNITED STATES PATENT OFFICE
CERTIFICATE OF CORRECTION

Patent No. 3,830,506 Dated August 20th, 1974

Inventor(s) Manfred Ewert et al

It is certified that error appears in the above-identified patent and that said Letters Patent are hereby corrected as shown below:

In the heading of the patent, change the Assignee's name from "TED Bildplatten Aktiengesellschaft" to --TED Bildplatten Aktiengesellschaft, AEG-TELEFUNKEN · TELDEC--; Column 1, line 13, change "or" (second occurrence) to --by--; Column 3, line 48, change "woudl" to --would--; Column 5, line 3, change "little" to --small--, line 7, change "art" to --air--, line 19, change "rotatable" to --reasons--, line 59, change "NO." to --No.--; Column 6, line 1, change "wrap" to --warp--, line 20, delete "Pat.", line 62, change "gas" to --air--.

Signed and sealed this 31st day of December 1974.

(SEAL)
Attest:

McCOY M. GIBSON JR.
Attesting Officer

C. MARSHALL DANN
Commissioner of Patents